(12) United States Patent
Inai et al.

(10) Patent No.: US 6,815,107 B2
(45) Date of Patent: Nov. 9, 2004

(54) GAS LEAK DETECTION METHOD FOR FUEL CELL

(75) Inventors: Shigeru Inai, Shioya-gun (JP); Katsumi Hayashi, Utsunomiya (JP); Yosuke Fujii, Kawachi-gun (JP); Minoru Koshinuma, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 1 day.

(21) Appl. No.: 10/206,504

(22) Filed: Jul. 26, 2002

(65) Prior Publication Data

US 2003/0022044 A1 Jan. 30, 2003

(30) Foreign Application Priority Data

Jul. 26, 2001 (JP) ..................................... P2001-226108

(51) Int. Cl.⁷ .......................... H01M 8/04; H01M 8/00; G08B 21/00; G01R 19/00
(52) U.S. Cl. .............................. 429/22; 429/25; 429/13; 340/659; 702/64
(58) Field of Search ............................... 429/13, 17, 12, 429/23, 22, 25, 90, 92; 340/635, 659, 660; 702/64, 58; 363/74

(56) References Cited

U.S. PATENT DOCUMENTS 6,156,447 A 12/2000 Bette et al.
6,638,650 B1 * 10/2003 Bailey et al. .................. 429/13

FOREIGN PATENT DOCUMENTS

| JP | 5-205762 | 8/1993 |
| JP | 9-27336 | 1/1997 |
| WO | WO 98/13890 | 4/1998 |
| WO | WO 00/39870 | 7/2000 |

* cited by examiner

Primary Examiner—Raymond Alejandro
(74) Attorney, Agent, or Firm—Lahive & Cockfield, LLP; Anthony A. Laurentano, Esq.

(57) ABSTRACT

In order to improve detecting accuracy in a gas leak detection for a fuel cell, in a gas leak detection method for a fuel cell having a solid polymer electrolyte membrane sandwiched by an anode and a cathode, an output voltage is measured in an activated over-potential region in a state in which the pressure of fuel gas which is supplied to the anode is maintained higher than the pressure of gas which is supplied to the cathode, and a gas leak is determined to exist when the output voltage is lower than a predetermined pressure value.

8 Claims, 5 Drawing Sheets

GAS LEAK DETECTION METHOD FOR FUEL CELL

BACKGROUND OF THE INVENTION

1. Field of the Invention

The present invention relates to gas leak detection methods for fuel cells, and particularly relates to a gas leak detection method for leaks due to damage or deterioration of solid polymer electrolyte membranes.

2. Description of Related Art

For a fuel cell which is carried in a fuel cell vehicle, for example, there is a fuel cell in which a solid polymer electrolyte membrane made from solid polymer ion exchange membrane is sandwiched between an anode and a cathode horizontally, and sandwiching outside of the anode and cathode is a pair of separators to form a fuel cell unit, and a stack is formed by stacking a plurality of fuel cell units each of which is provided with a hydrogen gas flow passage to which a hydrogen gas is supplied as a fuel gas, an air flow passage to which air including oxygen as an oxidizing gas is supplied, and a coolant liquid flow passage to which coolant liquid is supplied. Hereinafter, a fuel gas and an oxidizing gas may be called "reaction gases" in generally. In a fuel cell, a hydrogen ion which is generated in an anode by a catalytic reaction moves to a cathode after passing a solid polymer electrolyte membrane and generates electric current by having electrochemical reaction with oxygen in a cathode. After that, heat which is generated during electric current generation is removed by a coolant liquid in a coolant liquid flow passage so as to cool down a fuel cell.

In this fuel cell, the solid polymer electrolyte membrane has a function of allowing permeation of a hydrogen ions as an electrolyte, and a function to act as a partition wall so as to separate a hydrogen gas in a hydrogen gas flow passage and an oxidizing gas (air) in an air flow passage. Therefore, if this solid polymer electrolyte membrane has small holes, a hydrogen gas in a hydrogen gas flow passage leaks to an air flow passage.

Also, a hydrogen has high permeability, and even in a solid polymer electrolyte membrane which does not have a small hole, a hydrogen permeates (gas cross leak) a solid polymer electrolyte membrane in a molecular form. When a thickness of a solid polymer electrolyte membrane becomes reduced due to change over time, the amount of hydrogen permeation increases.

Here, as a root cause of thinning and damage of a solid polymer electrolyte membrane, damage to a fuel cells due to operating conditions for generating electric current such as low humidity, high temperature, and high work load, and damage caused by dynamic influences such as pressure differences between an anode and a cathode can be named.

In this way, when a hydrogen gas leaks to an air flow passage in a fuel cell, a hydrogen reacts with oxygen in the air in the air flow passage and heat is generated because hydrogen is a combustible gas; thus, there is a concern that a fuel cell may be adversely affected. Therefore, in a fuel cell, it is necessary to find leaks of hydrogen due to damage to a membrane or a thinning of solid polymer electrolyte membrane so as to deal with such a situation by replacing the solid polymer electrolyte membrane.

Conventionally, a method for a gas leak detection method in a fuel cell has been suggested as follows.

In a gas leak detection method which is disclosed in a Published Japanese Translation No. 2000-513134 of a PCT International Publication, an anode and a cathode of a fuel cell are purged by a nitride gas, a nitride gas is exhausted, and furthermore hydrogen is supplied to an anode while oxygen is supplied to a cathode, and the pressure of the gas at the cathode is made greater than the pressure of the gas at the anode keeping a reaction gas flow passage. In this state, an output voltage without electric current flow passages being closed such as an open circuit voltage (OCV) is measured so as to detect the gas leak by utilizing a detecting principle that an OCV decreases rapidly when a gas leak exists.

Also, in a gas leak detection method which is disclosed in a Japanese Unexamined Patent Application, First Publication No. Hei 5-205762, the existence of gas leak and the size of the gas leak are detected by closing a reaction gas flow passage of a fuel cell, supplying a nitrogen gas to an anode of the closed flow passage so as to generate a predetermined pressure difference between an anode and a cathode, and measuring the amount of nitrogen gas which leaks to a cathode.

Also, in a gas leak detection method which is disclosed in Japanese Unexamined Patent Application, First Publication No. Hei 9-27336, an anode and a cathode of a fuel cell are purged by a nitride gas, an electric current to a fuel cell is stopped, and furthermore hydrogen is supplied to an anode while an oxygen containing gas is supplied to a cathode, output voltage of a fuel cell is measured while reducing the supply amount of an oxygen containing gas to a cathode gradually so as to detect the gas leak by utilizing a detecting principle that the output voltage decreases rapidly when a gas leak exists.

Furthermore, in a method and apparatus for detecting a leak within a fuel cell which is disclosed in International Publication No. WO 00/39870, a gas leak in a fuel cell and the existence of a gas leak from an electrolyte membrane are detected by supplying a tracer gas which is an inert gas such as helium, argon, carbon dioxide, and nitrogen to one reaction gas which is supplied to a fuel cell, and measuring the concentration of tracer gas in another reaction gas.

Also, in a method and apparatus for detecting a gas leak which is disclosed in International Publication No. WO 98/13890, a gas leak is detected by detecting heat with an infrared ray camera caused by a reaction between an oxygen and a hydrogen due to a gas leak.

In a gas leak detection method which is disclosed in Published Japanese Translation No. 2000-513134 of a PCT International Publication, a gas leak is detected by making a pressure of gas in a cathode greater than a pressure of gas in an anode so as to monitor OCV when an oxygen in a cathode permeates a solid polymer electrolyte membrane and reaches an anode. However, an oxygen molecule is too big to permeate a solid polymer electrolyte membrane. Therefore, the OCV dispersion is small, and it was a problem in that detecting accuracy is not reliable. Also, in such a detection method, OCV change is monitored while closing a reaction gas flow passage. However, it is difficult to distribute a reaction gas uniformly in each cell in a stack. Therefore, the OCV dispersion is large, and there was a disadvantage in that the gas leak detecting accuracy became unreliable.

Also, in a gas leak detection method which is disclosed in Japanese Unexamined Patent Application, First Publication No. Hei 5-205762, a sensor which detects a nitrogen gas is necessary; thus, there was a problem in that the entire system became complicated. Furthermore, in such a detection method, although it is possible to detect a gas leak when a solid polymer electrolyte membrane has small holes, it is difficult to detect an increase of amount of gas permeation (gas leak) due to thinning of a membrane.

Also, in a gas leak detection method which is disclosed in Japanese Unexamined Patent Application, First Publication No. Hei 9-27336, an output voltage of a fuel cell is measured while reducing a supplying amount of an oxygen containing gas to a cathode gradually. However, there was a problem in that the detecting accuracy is unreliable because variance of the output voltage according to a change of the supplying amount of an oxygen containing gas is small.

In a method and apparatus for detecting a leak within a fuel cell which is disclosed in International Publication No. WO 00/39870, a tracer gas supplying device is necessary, and a sensor for measuring density of a tracer gas is also necessary. Therefore, there was a problem in that the overall system became complicated. Also, in such a detection method, although it is possible to detect a gas leak when a solid polymer electrolyte membrane has small holes, it is difficult to detect an increase of gas permeation (gas leak) amount due to the thinning of a membrane.

Also, in a method and apparatus for detecting a gas leak which is disclosed in International Publication No. WO 98/13890, there was a problem in detecting a gas leak while a fuel cell is disposed as a built-in stack because it is necessary to detect heat directly on a surface of a solid polymer electrolyte membrane.

SUMMARY OF THE INVENTION

Here, an object of the present invention is to provide a gas leak detection method in which a gas leak in a fuel cell can be detected easily and very accurately.

In order to solve the above-mentioned problems, a first aspect of the present invention is characterized in that, in a gas leak detection method for a fuel cell (for example a fuel cell unit 55 or a fuel cell 1 which are mentioned later in an embodiment) having a solid polymer electrolyte membrane (for example, a solid polymer electrolyte membrane 51 which is mentioned later in an embodiment) is sandwiched between an anode (for example, an anode 52 which is mentioned later in an embodiment) and a cathode (for example, a cathode 53 which is mentioned later in an embodiment), output voltage is measured in an activated over-potential region in a state in which pressure of fuel gas (for example, a hydrogen gas which is mentioned later in an embodiment) which is supplied to the anode is maintained higher than pressure of gas (for example, an air which is mentioned later in an embodiment) which is supplied to the cathode, and a gas leak is determined to exist when the output voltage is lower than a predetermined voltage value.

By such a gas leak detection method, when a solid polymer electrolyte membrane has small holes or becomes thin, when the pressure at an anode is higher than the pressure at a cathode, the amount of fuel gas which permeates a solid polymer electrolyte membrane from an anode to a cathode increases. As a result, an output voltage in an activated over-potential region decreases due to the existence of a fuel gas molecule near an electrode of a cathode. Here, a voltage dropping ratio is larger than the increasing ratio of fuel gas permeation in an activated over-potential region; thus, the dropping amount by which output voltage drops quite large; therefore, a gas leak can be detected quite sensitively. Accordingly, it is possible to determine that a gas is leaking when the output voltage is lower than a predetermined voltage value.

A second aspect of the present invention is characterized in that a gas leak detection method for a fuel cell of which a solid polymer electrolyte membrane is sandwiched between an anode and a cathode has steps in which pressure of fuel gas which is supplied to an anode is maintained to be higher than pressure of gas which is supplied to a cathode by changing either of pressure of fuel gas which is supplied to the anode and pressure of gas which is supplied to the cathode in a pulse manner, output voltage is measured in an activated over-potential region, and a gas leak is determined to exist when the output voltage is lower than a predetermined voltage value. Here, the same structures and reference numerals indicate the above-mentioned aspects of the present invention as in the case of the first aspect of the present invention.

By such a gas leak detection method in a second aspect of the present invention, comparing to an effect of the first aspect of the present invention, a pressure at an anode is made higher than a pressure at a cathode in a pulsed manner. Therefore, output voltage of an activated over-potential region drops in a pulsed manner. The rest of the effect obtained in the second aspect is the same as in the case of the first aspect.

A third aspect of the present invention, in a first or a second aspect of the present invention, is characterized in that it is performed while passing gas through an anode and a cathode.

By such a gas leak detection method, gas leak detection can be performed while supplying a gas to an anode and a cathode stably; thus, an output voltage can be stable.

As above explained, according to a first aspect of the present invention, it is possible to determine that a gas leak has occurred when an output voltage which is measured in an activated over-potential region is lower than a predetermined voltage value while maintaining pressure of a fuel gas which is supplied to an anode higher than the pressure of a gas which is supplied to a cathode. Therefore, it is possible to detect a gas leak easily. Also, an effect in that detecting accuracy is improved can be realized.

According to a second aspect of the present invention, it is possible to determine that a gas leak has occurred if an output voltage which is measured in an activated over-potential region while pressure of a fuel gas which is supplied to an anode is relatively higher than pressure of a gas which is supplied to a cathode is lower than a predetermined voltage value. Therefore, it is possible to detect a gas leak easily. Also, an effect in that detecting accuracy is improved can be realized. Also, when pressure of a gas at an anode is higher in a pulsed manner than pressure of a gas at a cathode, an output voltage follows a pressure variance and rapidly drops in a pulsed manner. Therefore, an effect in that detecting accuracy further is improved can be realized.

According to a third aspect of the present invention, it is possible to perform a gas leak detection while supplying a gas to an anode and a cathode stably. Therefore, an output voltage becomes stable, and detecting accuracy is improved.

BRIEF DESCRIPTION OF THE DRAWINGS

FIG. 4A shows a cell voltage distribution in an OCV. FIG. 4B shows a cell voltage distribution in a resistance over-potential region.

DETAILED DESCRIPTION OF THE INVENTION

Here, embodiments of gas leak detection method for a fuel cell according to the present invention are explained with reference to FIGS. 1 to 5 as follows.

Figure 1:
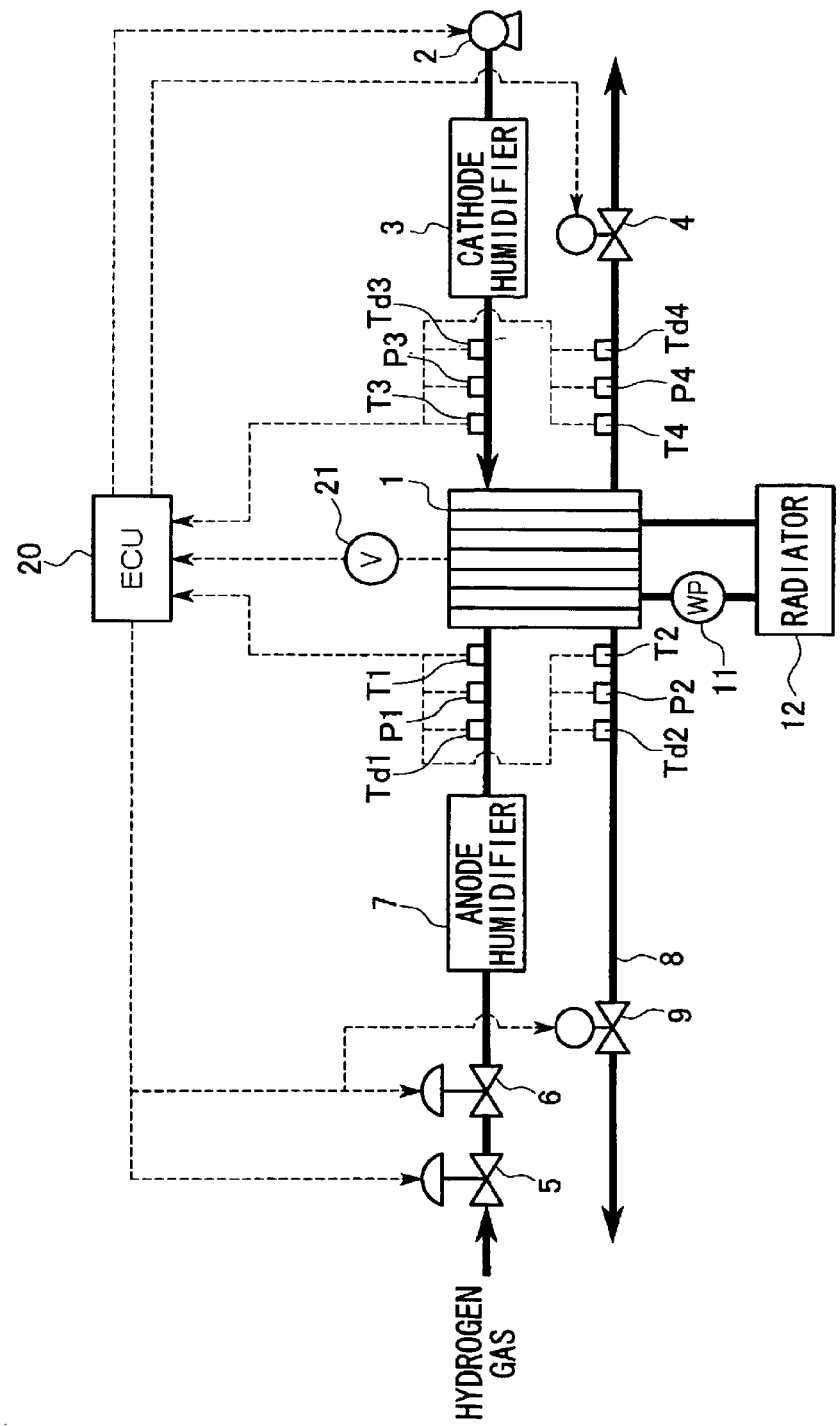
FIG. 1 is an view for showing a gas leak detection system according to the present invention.
Figure 2:
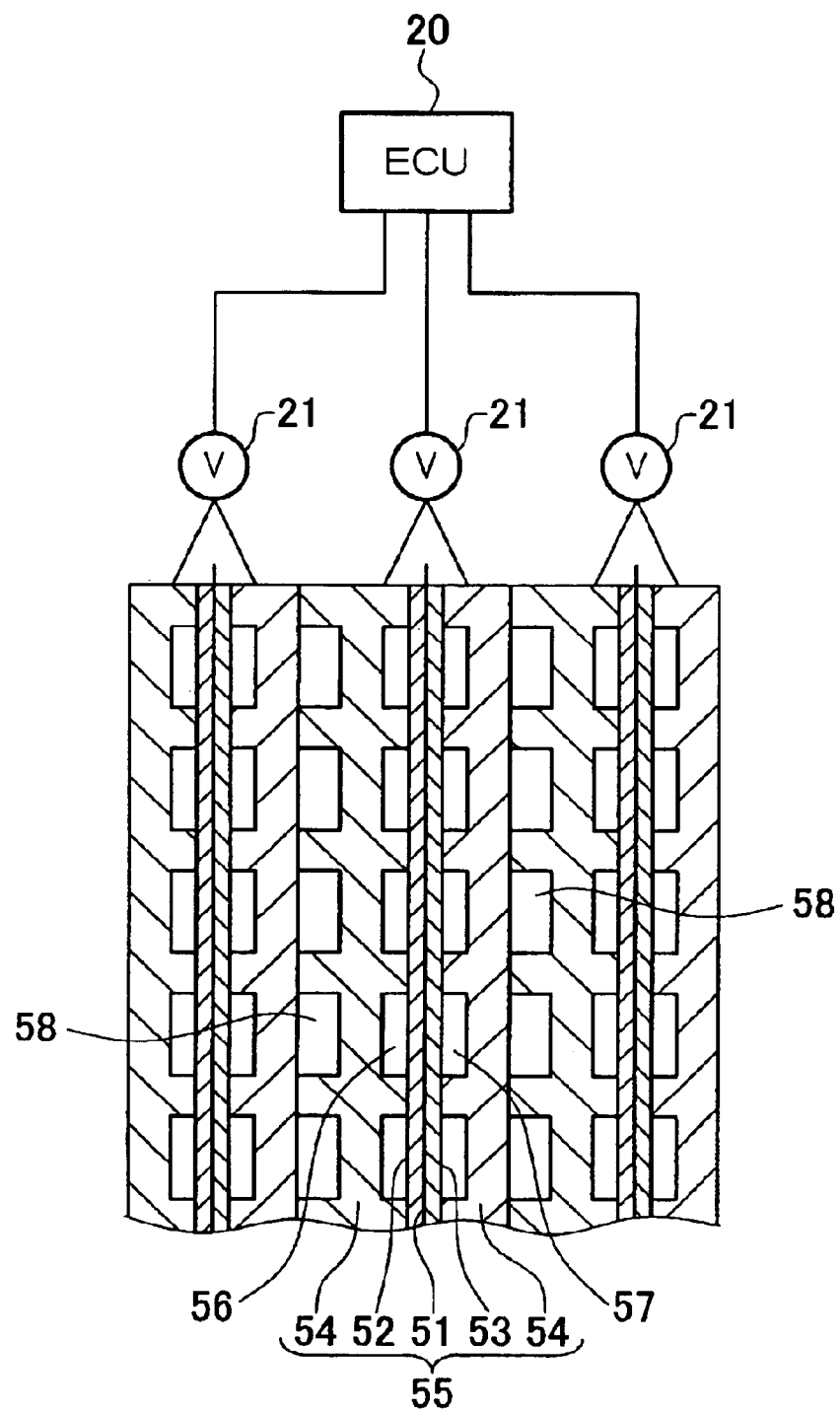
FIG. 2 is a cross section of a fuel cell.

FIG. 1 is a view showing an overall structure of a gas leak detection system for a fuel cell. FIG. 2 is a cross section of a part of a fuel cell 1. First, a fuel cell 1 is explained with reference to FIG. 2. A fuel cell 1 is a solid polymer electrolyte membrane fuel cell. A fuel cell is made from a stack made by stacking a plurality of cells 55 as fuel cell units. A cell 55 is formed by sandwiching a solid polymer electrolyte membrane 51 made of a solid polymer ion exchange membrane from both sides thereof by an anode 52 and a cathode 53, and further sandwiching thereoutside by a pair of separators 54, and 54. An example of a solid polymer ion exchange membrane is a perfluorosolfonic acid polymer, such as a perfluorosolfonic acid polymer sold in the consumer market under the Trademark "NAFION", registered by DUPONT. Each cell 55 is provided with a hydrogen gas flow passage 56 to which a hydrogen gas (reaction gas) is supplied as a fuel gas, an air flow passage 57 to which an air (reaction gas) including oxygen as an oxidizing gas is supplied, and a coolant liquid flow passage 58 to which a coolant liquid is supplied. Consequently, a proton which is generated by a catalyst reaction in an anode 52 permeates a solid polymer electrolyte membrane 51 and reaches to a cathode 53, and reacts with an oxygen electrochemically in a cathode 53; thus, electric current is generated. A coolant liquid flowing in a coolant liquid flow passage 58 takes heat away from a fuel cell 1 to cool down a fuel cell 1 so as to prevent a temperature of a fuel cell from exceeding a predetermined temperature due to heat generated in power generation.

Also, in a fuel cell 1, a voltage sensor (V) 21 for measuring an output voltage in each cell 55 is connected to separators 54, and 54 of each cell 55. An output signal of voltage sensor 21 is input to an ECU (electronic control unit) 20. In FIG. 1, only one voltage sensor 21 is shown to simplify the drawing.

Next, a gas leak detection system is explained with reference to FIG. 1. An atmospheric air 2 is compressed by an air compressor 2 and humidified by a cathode humidifier 3 so as to be supplied to a fuel cell 1. The air is distributed to an air flow passage 57 of each cell 55 in a stack. After an oxidant in the air is consumed for a power generation as an oxidizer, the air is collected in a stack again and exhausted from a fuel cell 1 as an air off-gas. The air is released to an atmosphere via a pressure control valve 4. Rotation of an air compressor 2 is controlled by an ECU 20 so as to supply air having required mass for gas leak detection to a fuel cell 1. Stroke of a pressure control valve 4 is controlled by an ECU 20 so as to make supplying pressure of an air to a fuel cell 1 a necessary pressure value for gas leak detection.

On the other hand, a hydrogen gas which is released from a high pressure hydrogen tank (not shown in the drawings) or a fuel reformer is decompressed to a predetermined value by a first pressure control valve 5. After that, flow amount of a hydrogen gas is adjusted to a predetermined value by a flow amount control valve 6. Furthermore, a hydrogen gas is humidified by an anode humidifier 7 so as to be supplied to a fuel cell 1. A hydrogen gas is distributed to a hydrogen gas flow passage 56 of each cell 55 in a stack. Among such hydrogen gas, non-reacted hydrogen gas after a power generation operation is collected in a stack again. A hydrogen gas is exhausted as a hydrogen off-gas from a fuel cell 1 to a hydrogen off-gas exhaust channel 8, and further exhausted to the outside of the apparatus via a pressure control valve 9. Here, stroke of a first pressure control valve 5 and the pressure control valve 9 is controlled by an ECU 20 so as to supply a hydrogen to a fuel cell 1 at a pressure value necessary for gas leak detection.

Here, by supplying a humidified air in a cathode humidifier 3 to a cathode 53 in a fuel cell 1 and supplying a humidified hydrogen gas in an anode humidifier 7 to an anode 52 in a fuel cell 1, moisture content of a solid polymer electrolyte membrane 51 in a fuel cell 1 is maintained adequately; thus, ion conductivity is obtained in a predetermined state.

A pressure of a coolant liquid for cooling down a fuel cell 1 is raised by a water pump (WP) 11 and supplied to a radiator 12. Heat in a coolant liquid is released to the outside of an apparatus by a radiator so as to cool down a coolant liquid. After that, a coolant liquid is supplied to a fuel cell 1 and takes heat from a fuel cell 1 so as to cool down a fuel cell 1 when passing a coolant liquid flow passage 58 in a fuel cell 1. By such a structure, heated coolant liquid returns to a radiator 12 via a water pump 11 so as to be cooled down.

Temperature sensors T1, T2, T3, and T4, pressure sensors P1, P2, P3, and P4, dew point sensors Td1, Td2, Td3, and Td4 are attached in an upstream directly next to a fuel cell 1 in a hydrogen gas supplying path, a downstream directly next to a fuel cell 1 in a hydrogen off-gas supplying path, an upstream directly next to a fuel cell 1 in an air supplying path, a downstream directly next to a fuel cell 1 in an air off-gas supplying path. An output signals from these sensors are input to an ECU 20.

Figure 3:
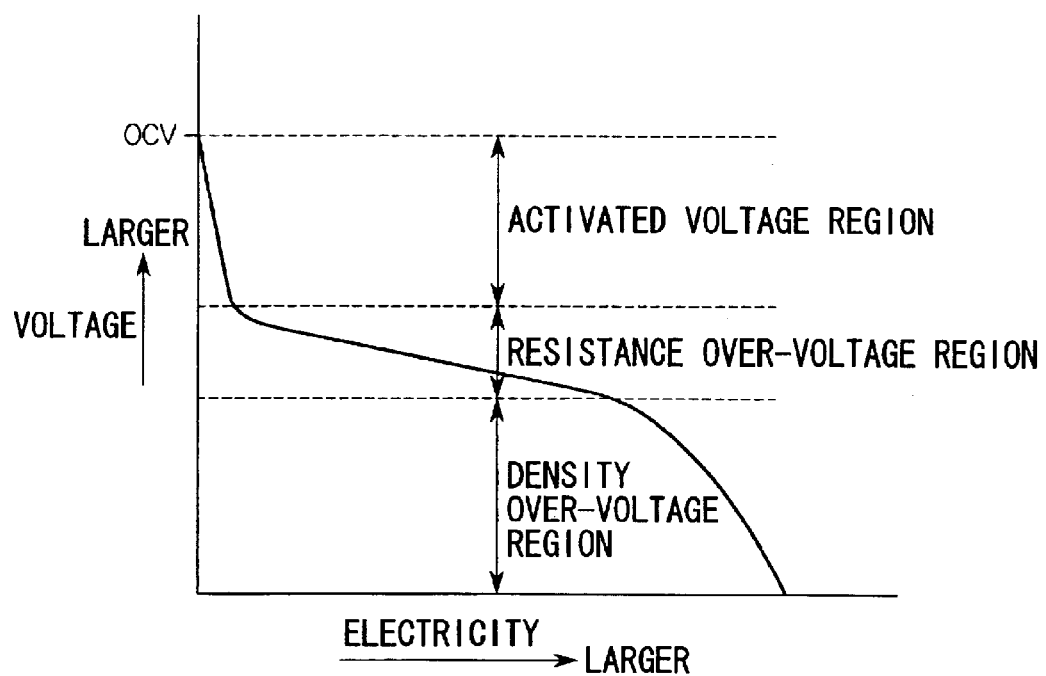
FIG. 3 is an output characteristics diagram of a cell as a fuel cell unit.

Next, a detecting principle of a gas leak detecting method in a fuel cell according to the present invention is explained with reference to a case in which a single cell is used. Between output electric current and output electric current in a cell as a fuel cell unit, there is an output characteristic as shown in FIG. 3. An output voltage becomes maximum at a voltage at which electric current does not flow such as OCV. Here, OCV is determined experimentally according to conditions of a reaction gas to be supplied to a normal cell such as temperature, pressure, flow amount, and humidity, etc., and a property of a solid polymer electrolyte membrane (hydrogen permeability) which is used in a cell.

When electric current flowing in a circuit increases gradually by changing a cell from an open circuit state to a closed circuit state, a cell exhibits the following output characteristics.

First, while the state of a cell changes from no-flow of electric current to a slight flow of electric current, an output voltage drops rapidly. Such a voltage is generally called an activated over-potential because such a potential is necessary to activate reaction. In explanations hereinafter, such a potential region is called an activated over-potential region. In explanations here, a very small amount of electric current is supposed to flow in an OCV to be actually measured and an OCV is supposed to be included in an activated over-potential region.

After passing an activated over-potential region, voltage dropping ratio according to an increase of electric current is lessened. A voltage at this time occurs due to an internal resistance of a cell, and such a voltage is called a concentration over-potential. Also, such a voltage region is called a resistance over-potential region.

After passing a resistance over-potential region, voltage dropping ratio according to an increase of an electric current becomes rapid again. A voltage at this time occurs due to a delay of mass transfer, and such a voltage is called a over-potential. Also, such a voltage region is called a concentration over-potential region.

As described above, output characteristics of a cell can be categorized generally into three voltage regions.

On the other hand, an output voltage in an activated over-potential region drops due to the fact that a hydrogen molecule passes through a solid polymer electrolyte membrane and a fuel gas molecule exists near an electrode in a cathode. Such a state is ostensibly equivalent to a state in which an output voltage drops due to a flow of electric current. Here, if the thickness of a solid polymer electrolyte membrane becomes reduced due to deterioration or developing porosity, an amount of the hydrogen molecules which permeates a solid polymer electrolyte membrane increases. Accordingly, even if a condition for supplying a reaction gas remains the same, in a cell (hereinafter called a failure cell) having a deteriorated solid polymer electrolyte membrane, more hydrogen molecule permeates a solid polymer electrolyte membrane than in the case of a cell (hereinafter called a normal cell) having a normal solid polymer electrolyte membrane. Therefore, the state of the cell becomes equivalent to the case in which a large amount of electric current flows; thus, a voltage of a failure cell becomes lower than a voltage of a normal cell. By such a structure, it is possible to determine whether a cell is a normal cell or a failure cell by measuring a cell voltage; thus, it is possible to detect a gas leak from a cell.

Here, due to output characteristics of a cell, variance of voltage according to a variance of electric current is quite large in an activated over-potential region, and a variance of voltage according to a variance in electric current is small in a resistance over-potential region. Therefore, when cell voltage is measured for detecting a gas leak in a cell, detecting accuracy is greater by measuring in an activated over-potential region than in a resistance over-potential region because even a small variance in electric current is represented by a large variance in voltage. Therefore, in the present invention, a gas leak detection is performed in an activated over-potential region in a cell.

FIG. 4 shows an example of an experimental result in which a voltage in each cell is measured while supplying a reaction gas to a stack made by stacking n pieces of cell (n is an integral number) having a failure cell under a same experimental condition. Experimental conditions are as follows.

Dew point of a fuel gas is set at 55° C. Dew point of a oxidizing gas is set at 65° C. Temperature of reaction gas which is supplied to an anode and a cathode is set at 70° C. Pressure of a reaction gas which is supplied to an anode is set at 40 kPa. Pressure of a reaction gas which is supplied to a cathode is set at 10 kPa. Amount of reaction gas which is supplied to an anode and a cathode is set at a flow amount which is equivalent to 50% of utilization ratio of 50 A of electric current.

Figure 4A:
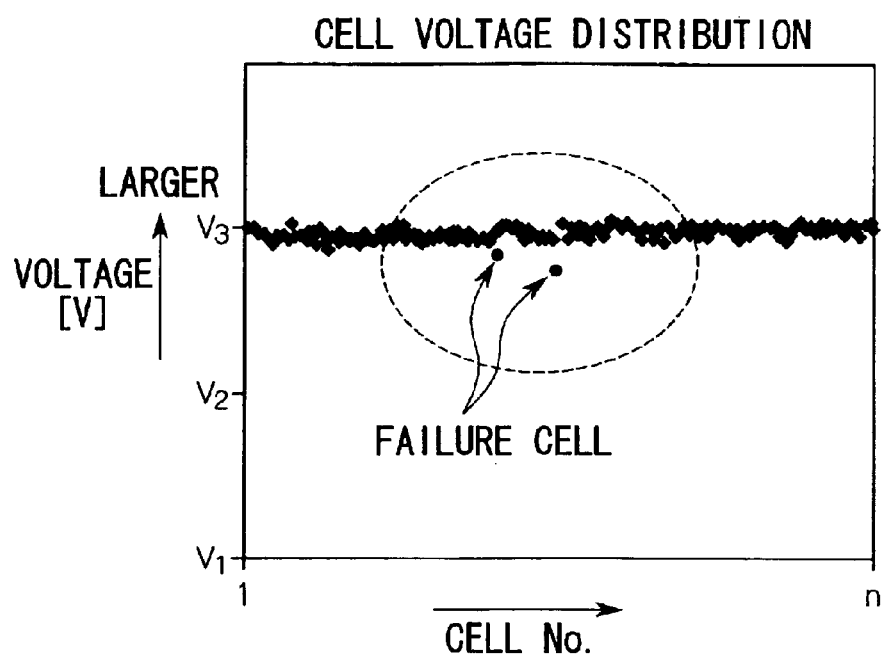
FIGS. 4A and 4B are examples for cell voltage distribution.
Figure 4B:
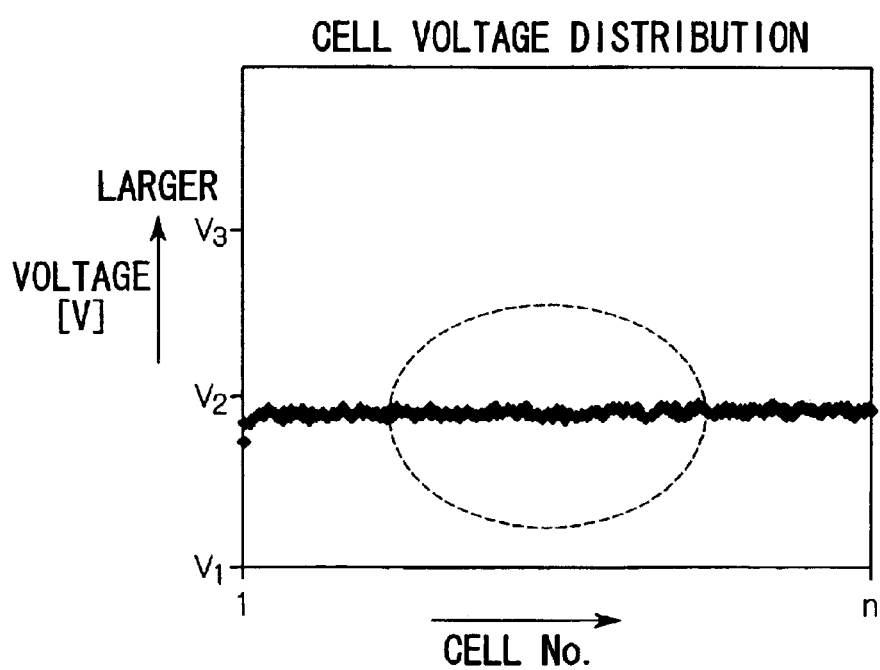

FIG. 4A is a result of a measurement of OCV in each cell. FIG. 4 is a result of a measurement of each cell voltage in a resistance over-potential region. Although it is difficult to determine which cell is a failure cell in FIG. 4B, in contrast, it is possible to clearly determine which cell is a failure cell due to a gas leak in FIG. 4A. Therefore, it is possible to detect a failure cell due to a gas leak with high accuracy by measuring cell voltage in an activated over-potential region.

In an ordinary power generating operation in a cell, a pressure difference between an anode and a cathode is restrained to the minimum as long as power generating operation is available from a viewpoint of protecting a solid polymer electrolyte membrane. Therefore, detecting accuracy is high when a cell voltage is measured in an activated over-potential region. In contrast, when a gas leak detection is performed under the above-mentioned pressure difference condition in an ordinary power generation, aside from a case in which a solid polymer electrolyte membrane has large holes so that a large number of hydrogen molecules can permeate even under a slight pressure difference, if a solid polymer electrolyte membrane is has a small hole, or if a solid polymer electrolyte membrane becomes thin due to deterioration of a membrane, the increased amount of permeating hydrogen molecules is small; thus, it is difficult to obtain a satisfactory detecting accuracy because of the pressure difference between a normal cell and a failure cell.

In a gas leak detection method according to the present invention, a cell voltage is measured in an activated over-potential region while a pressure difference between an anode reactant gas and a cathode reactant gas is made larger than in a case of an ordinary power generating condition, and an anode reactant gas entrance pressure is maintained relatively higher than a cathode reactant gas entrance pressure. The existence of a gas leak is determined when a cell voltage is lower than a predetermined voltage value. In this way, when pressure at an anode is higher than pressure at a cathode, a hydrogen molecule in an anode in a failure cell can easily permeate holes of a solid polymer electrolyte membrane or thin membrane region. Also, a greater amount of hydrogen molecules permeates than under ordinary pressure difference conditions, and voltage drop appears in an amplified manner; thus, detecting accuracy can be improved.

Also, in the present invention, hydrogen molecules permeate a solid polymer electrolyte membrane while making the reactant gas pressure at an anode higher than the reactant gas pressure at a cathode. This is because a hydrogen molecule is smaller than an oxygen molecule; therefore, a hydrogen molecule can easily permeate a solid polymer electrolyte membrane; thus, it is possible to enhance a detecting accuracy. In contrast, when the pressure at a cathode is higher than the pressure at an anode, although an oxygen molecule can permeate a solid polymer electrolyte membrane, an oxygen molecule still hardly permeates thereinto because it is large; therefore, detecting accuracy is lower.

Furthermore, in a gas detection method according to the present invention, a gas detection is performed while flowing a reaction gas. This is because a cell voltage, such as an OCV in particular, is more stable under conditions in which a reaction gas is flowing than under conditions in which a reaction gas is not flowing. In particular, when a gas leak detection is performed on a stack made by stacking numerous cells, it is possible to distribute a reaction gas into each cell nearly uniformly while flowing a reaction gas. As a result, it is possible to prevent a cell voltage from dispersing due to a non-uniform flow of a reaction gas among cells; thus, accuracy for determining a failure cell in which a gas leak occurs is improved.

Figure 5:
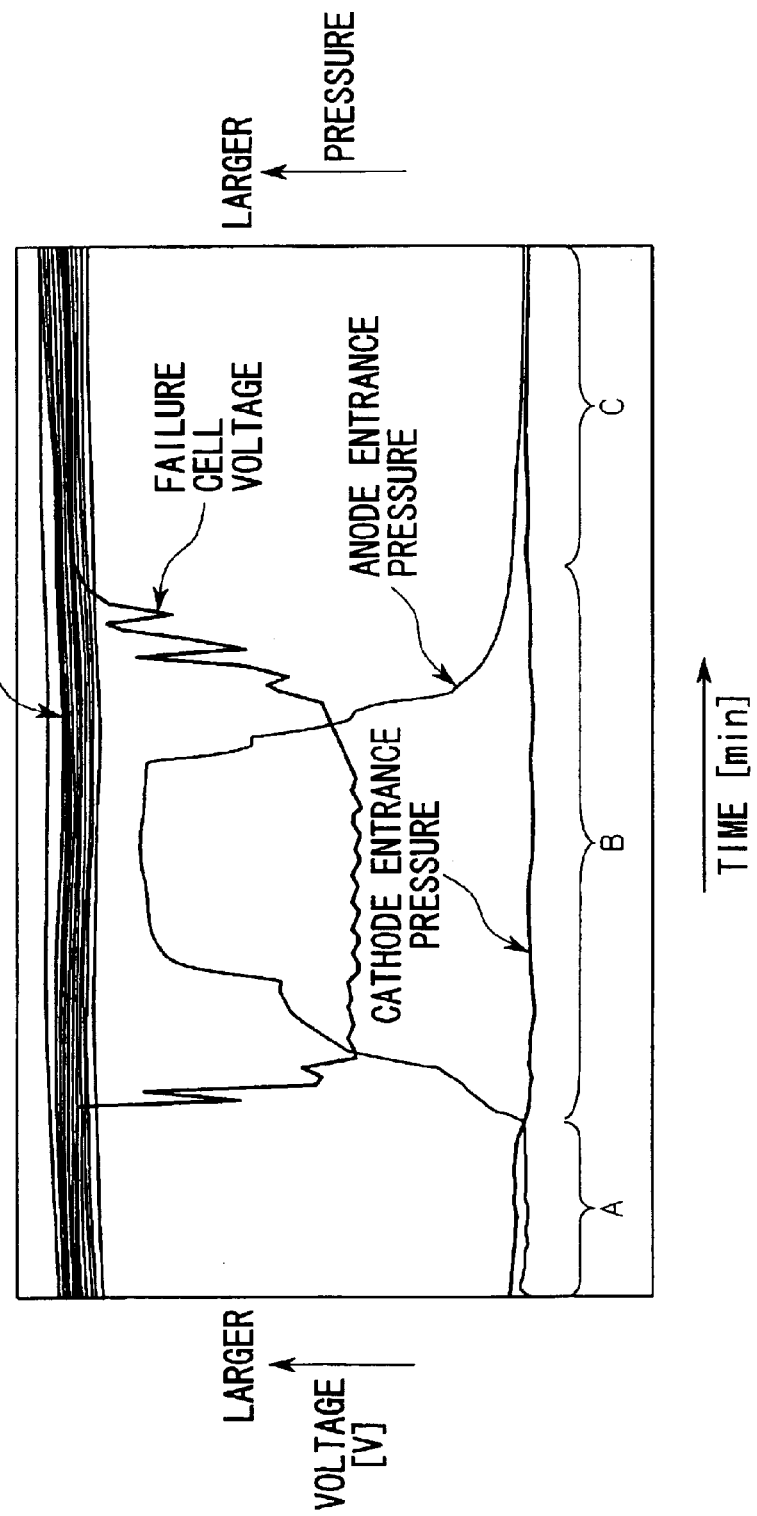
FIG. 5 is a result of a cell voltage measurement in an embodiment in a gas leak detection method according to the present invention.

Next, an experimental example in which a gas detection method according to the present invention is performed on a fuel cell 1 in a stack is explained with reference to a result of cell voltage measurement as shown in FIG. 5.

First, before performing a gas leak detection, a circuit of a fuel cell 1 is made to open while maintaining a supply of a reaction gas (hydrogen gas and air) to a fuel cell 1. The reason for making a circuit of a fuel cell 1 open is to measure an OCV of each cell 55 which forms a stack.

Conditions for supplying a reaction gas at this time are the same as conditions in an experiment for measuring a voltage of a cell shown in FIG. 4. Only a pressure for supplying a reaction gas to an anode is 40 kPa in an experiment shown in FIG. 5.

Next, for preparation for a gas leak detection, the pressure at a cathode entrance is made slightly higher than the pressure at an anode entrance (section A in FIG. 5). By doing this, a permeation of a hydrogen from an anode to a cathode is restrained; thus, a difference of cell voltage does not appear between a failure cell and a normal cell at this point in time. Also, by preparing for a detection in this way, it is possible to make a drop in a cell voltage conspicuous which is caused by an increased amount of a permeating hydrogen in a failure cell when pressure at an anode is made higher.

Next, while maintaining a flow of a reaction gas, pressure at an anode entrance is varied in a pulse manner and the pressure at an anode entrance is made higher than the pressure at a cathode entrance only by a predetermined pressure value instantly, and such a pressure condition is maintained for a predetermined period of time (section B in FIG. 5). In the present experiment, pressure at an anode entrance after being pressurized is 40 kPa, and the rest of the conditions are the same as the conditions before being pressurized. By doing this, the pressure at an anode is higher than the pressure at a cathode, the amount of hydrogen which permeating a solid polymer electrolyte membrane rapidly increases in a failure cell, and only the cell voltage (OCV) of a failure cell rapidly drops. A cell voltage (OCV) of a failure cell changes so as to follow a change of pressure at an anode entrance without having a time delay. That is, a cell voltage (OCV) changes in a pulse manner so as to follow a pulse-manner change of pressure at an anode entrance. In contrast, in a normal cell, the amount of hydrogen molecule which permeates a solid polymer electrolyte membrane does not vary even if pressure at an anode increases; thus a cell voltage (OCV) hardly changes.

Therefore, it is possible to determine that a gas leak is occurring in a cell in which the cell voltage (OCV) is lower than a predetermined voltage value. Also, it is possible to determine that such a cell is a failure cell in which a solid polymer electrolyte membrane has small holes or a solid polymer electrolyte membrane has thinned.

Here, determination of whether or not a gas leak is occurring can be performed by comparing an average value of a cell voltage (OCV) of an entire cell to the voltage of each cell, or by comparing a standard deviation of all cells to a deviance of each cell. It should be more preferable to determine according to attributes of a solid polymer electrolyte membrane and a map of reference voltages which are obtained from conditions of supplied reaction gas such as temperature, humidity, and pressure in the experiment. Also, when a cell voltage (OCV) which is measured while applying a pressure difference to an anode and a cathode and a cell voltage (OCV) which is measured while no pressure difference is applied to an anode and a cathode are compared, if the value obtained by subtracting a latter OCV from a former OCV is lower than a predetermined value, it is possible to determine that such a cell is a normal cell. If the value obtained by subtracting a latter OCV from a former OCV is higher than a predetermined value, it is possible to determine that such a cell is a failure cell.

After the above-mentioned predetermined period of time passes, the pressure at an anode entrance is made nearly equal to the pressure at a cathode entrance (10 kPa), the pressure at anode entrance is adjusted back to a pressure in an ordinary power generating condition in which pressure at an anode is slightly higher than pressure at a cathode (section C in FIG. 5). By doing this, although pressure at an anode is higher than pressure at a cathode, the pressure difference is very small; thus, regarding cell voltage (OCV), a cell voltage difference hardly occurs between a normal cell and a failure cell.

When varying pressure at an anode entrance, it is preferable that pressure at an anode entrance should by varied in a pulse manner and the pressure should be raised instantly. Also, it is preferable that the above-mentioned predetermined period of time for maintaining such pressure condition be short as long as the variance of cell voltage (OCV) can be measured, and the pressure should be dropped instantly immediately after such a period of time elapses. The above-mentioned predetermined period of time is set to be as short as possible in order to minimize a damage in a solid polymer electrolyte membrane and a catalyst due to high temperature caused by an oxidization reaction of a hydrogen when a failure cell exists and hydrogen leaks.

Here, conditions for performing a gas leak detection is additionally explained. Both the pressure at an anode entrance and the pressure at a cathode entrance in both timings such as before-pressurizing an anode (section A in FIG. 5) after-decompressing an anode (section C in FIG. 5) are made 10 kPa from a viewpoint of protecting a stack. It is preferable that the pressure after the pressure at an anode entrance be raised (maximum value of anode pressure in section B in FIG. 5) should be 30 to 50 kPa, and pressure difference between an anode and a cathode should be 10 to 40 kPa. This is because the detecting accuracy becomes lower if the pressure difference is less than 10 kPa, and there is a concern that a solid polymer electrolyte membrane may be damaged if the pressure difference is higher than 40 kPa.

Flow amount of a reaction gas is set to an equivalent amount of a reaction gas by which a normal electric current flows in a normal cell so that an ordinary constant electric current operation is possible. When performing a gas leak detection in a cell in a stack, it is necessary to flow more than a predetermined amount of a reaction gas such that the gas is distributed uniformly among cells. However, if the flow amount of a reaction as is too great, a fuel gas which permeates a solid polymer electrolyte membrane is diluted instantly; and detecting accuracy becomes worsened. Therefore, it is necessary to adjust the flow amount of a reaction gas so as to obtain the highest detecting accuracy.

Low humidity of a reaction gas is preferable because an OCV value to be measured is enhanced and the detecting accuracy is improved. However, if humidity is excessively low, there is a concern that a solid polymer electrolyte membrane may be damaged. Therefore, it is preferable that the humidity of a reaction gas be as low as possible as long as the solid polymer electrolyte membrane is not damaged.

It is preferable that an OCV value to be measured be high so as to enhance detecting accuracy. Therefore, temperature of a fuel cell 1 is set within a range of operational temperature of a fuel cell 1. A fuel cell 1 is cooled by a coolant liquid as little as possible so that a solid polymer electrolyte membrane should not be damaged. A solid polymer electrolyte membrane is made of a perfluorosulfonic acid polymer.

For a factor which has an influence on an OCV to be measured, pressure of a reaction gas, thickness of a solid polymer electrolyte membrane, and attributes of a solid polymer electrolyte membrane can be named in addition to the above-mentioned temperature and humidity. An OCV to be measured becomes higher if the pressure of a reaction gas which is supplied is higher. Also, an OCV to be measured becomes higher if the thickness of a solid polymer electrolyte membrane is thicker.

Also, it is preferable that an anode and a cathode in a fuel cell 1 be purged by an inert gas such as a nitrogen gas before and after a gas leak detection is performed. This is for the purpose of avoiding applying excessive thermal load on a solid polymer electrolyte membrane and a catalyst when hydrogen and oxygen remaining in a cathode and an anode react and generate heat.

In this way, by a gas leak detection method of the present invention, it is possible to perform a gas leak detection while maintaining a fuel cell 1 in a power generating state, and to determine a failure in which a gas leak occurs. Also, it is possible to detect not only a failure cell in which a solid polymer electrolyte membrane has small holes, but also a failure cell in which thickness of a solid polymer electrolyte membrane has become thin due to deterioration. This gas leak detection method can be performed not only in a state in which a fuel cell is assembled in a stack, but also in a state in which there is only one fuel cell. Also, this gas leak detection method can be performed not only for a quality check before shipment from factories but also in a fault diagnosis for a fuel cell which is used for a power generation.

The present invention is not limited to the above-mentioned embodiments. In the above-mentioned embodiments, a hydrogen gas and air are supplied as a reaction gas to a fuel cell 1 when a gas leak detection is performed. For example, it is possible to perform a gas leak detection even if an inert gas such as a nitrogen gas is supplied instead of supplying an air to a cathode. By doing this, an oxidization reaction of hydrogen does not occur even if a hydrogen permeates a solid polymer electrolyte membrane in a failure cell. Therefore, it is possible to prevent a solid polymer electrolyte membrane from being damaged when performing a gas leak detection. Also it is possible to prevent existing flaws from severely worsening.

In the above-mentioned embodiments, a gas leak detection is performed in an open circuit voltage (OCV). A gas leak detection method of the present invention is not necessarily limited to a case in which an OCV is used. A gas leak detection method of the present invention can be also performed in an activated over-potential region in which a voltage varying amount is large according to an slight varying amount of electric current.

Furthermore, a gas leak detection method of the present invention can be applied to a fuel cell which is assembled in a fuel cell automobile.

What is claimed is:

1. A method of detecting a gas leak for a fuel cell having a solid polymer electrolyte membrane sandwiched between an anode and a cathode, comprising the steps of:

maintaining a pressure of fuel gas which is supplied to an anode to be higher than a pressure of a gas which is supplied to a cathode by changing one of the pressure of the fuel gas supplied to the anode and the pressure of the gas supplied to the cathode in a pulsed manner;

measuring an output voltage of the fuel cell in an activated over-potential region; and determining a gas leak exists when the output voltage is lower than a predetermined voltage value, wherein:

the output voltage is measured in the activated over-potential region in a state in which pressure of the fuel gas which is supplied to the anode is maintained higher than pressure of the gas which is supplied to the cathode; and gas leak is determined to exist when the output voltage is lower than predetermined voltage value.

2. A method of detecting a gas leak for a fuel cell having a solid polymer electrolyte membrane sandwiched between an anode and a cathode, comprising the steps of:

maintaining a pressure of fuel gas which is supplied to an anode to be higher than a pressure of a gas which is supplied to a cathode by changing one of the pressure of the fuel gas which is supplied to the anode and the pressure of the gas which is supplied to the cathode in pulsed manner;

measuring output voltage of the fuel cell in an activated over-potential region; and determining a gas leak exists when the output voltage is lower than a predetermined voltage value.

3. A method of detecting a gas leak for a fuel cell, according to claim 1, wherein gas leak detection is performed while passing inert gas through an anode and a cathode.

4. A method of detecting a gas leak for a fuel cell, according to claim 1, wherein gas leak detection is performed while passing inert gas through an anode and a cathode.

5. A method of detecting a gas leak for a fuel cell, according to claim 1, wherein gas leak detection is performed by measuring output voltage in an activated over-potential region where a voltage change to electric current change is large.

6. A method of detecting a gas leak for a fuel cell, according to claim 2, wherein gas leak detection is performed while passing gas through an anode and a cathode.

7. A method of detecting a gas leak for a fuel cell, according to claim 2, wherein gas leak detection is performed while passing inert gas through an anode and a cathode.

8. A method of detecting a gas leak for a fuel cell, according to claim 2, wherein gas leak detection is performed by measuring output voltage in an activated over-potential region where a voltage change to electric current change is large.

* * * * *